United States Patent [19]

Uchida et al.

[11] Patent Number: 5,786,650
[45] Date of Patent: Jul. 28, 1998

[54] ROTOR FOR SYNCHRONOUS MOTOR

[75] Inventors: Hiroyuki Uchida; Takashi Okamoto; Hidetoshi Uematsu, all of Yamanishi, Japan

[73] Assignee: Fanuc, Ltd., Yamanishi, Japan

[21] Appl. No.: 873,879

[22] Filed: Jun. 11, 1997

Related U.S. Application Data

[63] Continuation of Ser. No. 318,676, filed as PCT/JP94/00227, Feb. 15, 1994 published as WO94/18740, Aug. 18, 1994, abandoned.

[30] Foreign Application Priority Data

Feb. 15, 1993 [JP] Japan ............... 5-025765

[51] Int. Cl.⁶ ................... H62K 21/12
[52] U.S. Cl. ............ 310/156; 310/91; 310/216; 310/217; 310/218; 310/261; 310/262
[58] Field of Search ............ 310/91, 216, 217, 310/218, 202, 156, 261

[56] References Cited

U.S. PATENT DOCUMENTS

| | | | |
|---|---|---|---|
| 4,469,970 | 9/1984 | Neumann. | |
| 4,568,846 | 2/1986 | Kapadia. | |
| 5,010,266 | 4/1991 | Uchida et al. | 310/156 |
| 5,338,996 | 8/1994 | Yamamoto | 310/217 |
| 5,378,953 | 1/1995 | Uchida et al. | 310/156 |

FOREIGN PATENT DOCUMENTS

| | | |
|---|---|---|
| 56-57684 | 5/1981 | Japan. |
| 58-46857 | 3/1983 | Japan. |
| 64-75124 | 3/1989 | Japan. |
| 3-1647 | 1/1991 | Japan. |

OTHER PUBLICATIONS

Patent Abstracts of Japan, vol. 8 No. 181 (E–261) [1618], 21 Aug. 1984 & JP–A–59 072968 (FANUC) 25 Apr. 1984.

Patent Abstracts of Japan, vol. 8 No. 161 (E–257) [1598], 26 Jul. 1984, & Japan–A–59 059057 (FANUC) 4 Apr. 1984.

*Primary Examiner*—Steven L. Stephan
*Assistant Examiner*—Elvin G. Enad
*Attorney, Agent, or Firm*—Nikaido Marmelstein Murray & Oram LLP

[57] ABSTRACT

A rotor (10) includes a plurality of permanent magnets (14) disposed substantially equidistantly round a shaft (12) and a plurality of laminated core members (16) each being disposed between the permanent magnets (14) and forming a magnetic pole. The laminated core embers (16) are formed by laminating and bonding a large number of thin magnetic plate cores (26) and integral type thin cores. The integral type thin core (26) includes a plurality of thin core portions having the same shape and connecting portions (46) for connecting mutually the adjacent thin core portions. When a large number of thin cores (26) and integral type thin cores are integrally joined by a press work, each laminated core member (16) is mutually interconnected between the adjacent laminated core members (16) with a relative arrangement at the time of completion of assembly having installation spaces of permanent magnets (14), and an integrated type laminate rotor core (48) is formed.

6 Claims, 20 Drawing Sheets

ROTOR FOR SYNCHRONOUS MOTOR

This application is a continuation of application Ser. No. 08/318,676, filed as PCT/JP94/00227, Feb. 15, 1994 published as WO94/18740, Aug. 18, 1994 now abandoned.

TECHNICAL FIELD

The present invention relates to a rotor for a synchronous motor, which includes a plurality of permanent magnets disposed around a shaft and magnetized alternately in a circumferential direction, and a plurality of laminated core members disposed around the shaft while holding each permanent magnet therebetween in the circumferential direction so as to form magnetic poles.

BACKGROUND ART

In the field of synchronous motors, a rotor as mentioned above, which includes permanent magnets magnetized in a circumferential direction and laminated core members each forming a magnetic pole between the permanent magnets, the magnets and the core members being alternately disposed around a shaft, has been used. In this type of conventional rotor, each laminated core member is generally formed by stacking a plurality of core-laminations made of magnetic materials such as silicon steel plates. Each core-lamination may have recesses and projections, which are formed at corresponding positions on respective axial end faces of core-lamination and can be engaged with each other. The core-laminations can be joined to each other by, e.g., press-fitting the core-laminations together while aligning the recesses and projections of the adjacent core-laminations. Each permanent magnet is held between a pair of adjacent laminated core members and brought into close contact with the side faces of the latter.

The permanent magnet may be positioned and fixedly supported in a radial direction by outer and inner hooks protruding from the side faces of each laminated core member at outer and inner peripheral regions thereof. A rod member may be inserted into an axial through hole formed generally at the center of each laminated core member. Each rod member may be connected to annular end plates which are arranged at both axial ends of the laminated core member and fixed to the rotating shaft. In this manner, the laminated core members and the permanent magnets are fixedly held in the rotor against external force such as centrifugal force, by the end plates, the rod members and the hooks.

This type of rotor uses a plurality of permanent magnets and laminated core members, the number of which corresponds to the number of magnetic poles, therefore it has problems in that the work of positioning or fixing the permanent magnets and laminated core members is complicated, increased working time and skilled workers are required, and thus improvement of personnel requirements and productivity is prevented. Further, the accuracy of positioning the permanent magnets and laminated core members depends on the mechanical strength and processing accuracy of the rod members and end plates. Consequently, in the case of high speed motors or high torque motors, additional means for improving the mechanical strength of the whole structure of the rotor is required in order to accurately hold the permanent magnets and laminated core members in predetermined positions.

DISCLOSURE OF THE INVENTION

An object of the preset invention is to provide a rotor for a synchronous motor including permanent magnets and laminated core members disposed around a rotating shaft alternately in a circumferential direction, which can facilitate positioning or fixing processes of the permanent magnets and laminated core members in an assembling process so as to improve productivity, and also can improve mechanical strength and thus performance and reliability of a high speed or high torque motor.

To accomplish the above objects, the present invention provides a rotor for a synchronous motor comprising a shaft; a plurality of permanent magnets disposed around the shaft at generally equal intervals; a plurality of core members disposed around the shaft while holding each of the permanent magnets therebetween in a circumferential direction, so as to form magnetic poles; supporting means for fixedly supporting the permanent magnets and the core members onto the shaft; and connecting means for connecting the core members located at desired positions around the shaft with each other in a relative arrangement of a finished rotor assembly.

In the rotor according to the present invention, the connecting means enables the core members located at desired positions to be integrally handled in a state in which they are already relatively positioned. Accordingly, the productivity for assembling a rotor is significantly improved, and, after being assembled, the mechanical strength of a rotor structure is improved because the connecting means assists the support of the core members and the permanent magnets against an external force such as a centrifugal force.

In a preferred embodiment of the present invention, each of the core members is a laminated core member formed by axially stacking and joining a plurality of core-laminations made of magnetic materials, and the connecting means comprises at least one integral core-lamination made of a magnetic material, the integral core-lamination including sections which are inserted between the core-laminations of the laminated core members located at the desired positions and are joined to adjacent core-laminations. In this case, the integral core-lamination may include core-lamination sections having shapes generally the same as those of the core-laminations of the laminated core members and the number thereof being the same as the number of magnetic poles so as to be inserted and joined between the core-laminations, and also include connecting portions extended from the core-lamination sections so as to annularly connect all of the core-lamination sections in a predetermined arrangement, whereby all of the core-lamination sections are connected in such a relative arrangement of a finished rotor assembly that a space for locating each, permanent magnet is defined between adjacent core-lamination sections, so as to form an integral laminated rotor core. Alternatively, the integral core-lamination may include core-lamination sections having shapes being generally the same as those of the core-laminations of the laminated core members and the number thereof being half the number of magnetic poles so as to be inserted and joined between the core-laminations, and connecting portions extended from the core-lamination sections so as to annularly connect all of the core-lamination sections in a predetermined arrangement, whereby all of the laminated core members forming the same magnetic poles are connected in such a relative arrangement of a finished assembly that a space for locating one laminated core member forming another magnetic pole and two permanent magnets is defined between adjacent core-lamination sections.

BRIEF DESCRIPTION OF THE DRAWINGS

The foregoing and the other objects, features, and advantages of the present invention will be described with reference to the embodiments shown in the accompaning drawings, in which.

BEST MODE OF CARRYING OUT THE INVENTION

Figure 1A:
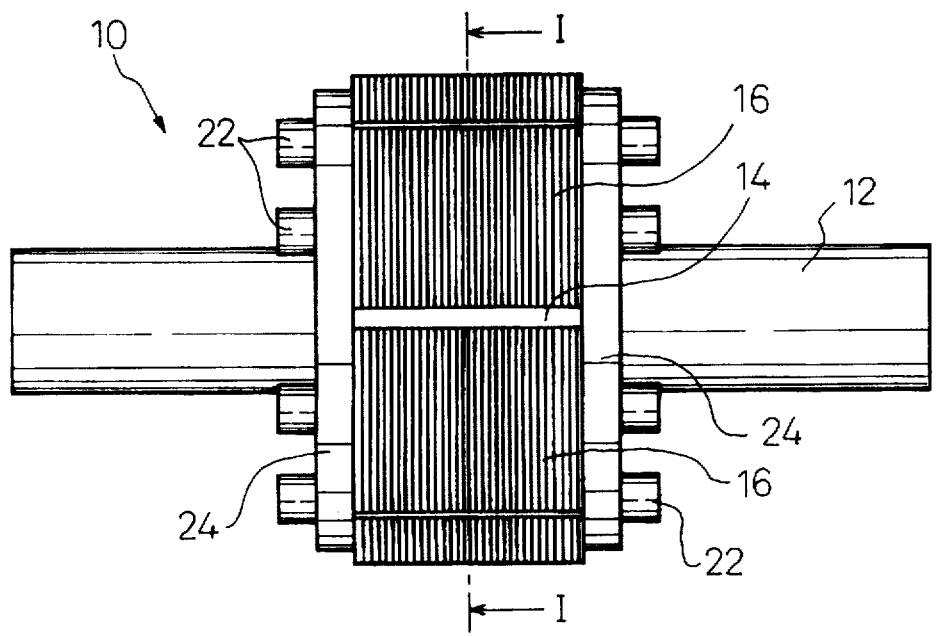
FIG. 1A is a side view of a rotor according to an embodiment 1 of the present invention.

In the following description of embodiments, the same or similar components are represented by the same reference numerals.

Embodiment 1

Figure 1B:
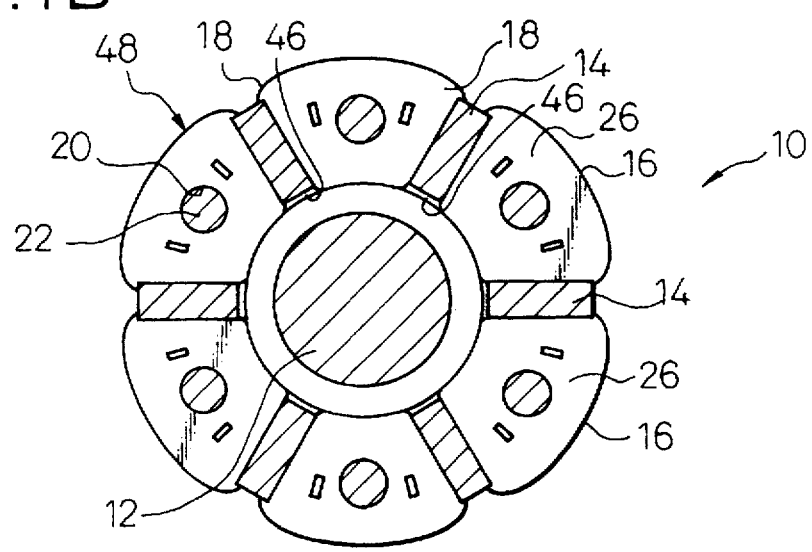
FIG. 1B is a sectional view taken along line I—I of FIG. 1A.

Referring to the drawings, FIGS. 1A and 1B show a rotor 10 for a synchronous motor according to the embodiment 1 of the present invention. The rotor 10 includes a shaft 12, a plurality (six in this embodiment) of permanent magnets 14 disposed around the shaft 12 at generally equal intervals and magnetized alternately in a circumferential direction, and a plurality (six in this embodiment) of laminated core members 16 disposed around the shaft 12 while holding each permanent magnet 14 therebetween in the circumferential direction so as to form magnetic poles. Each permanent magnet 14 is held between and brought into close contact with the side faces of adjacent laminated core members 16. Each laminated core member 16 includes outer hooks 18 protruding from both sidefaces at outer peripheral regions thereof. Therefore, each permanent magnet 14 is positioned in a radial direction by the outer hook 18 of the laminated core member 16 and fixedly supported against centrifugal force. The laminated core members 16 are respectively provided with rod holes 20 axially penetrating through the generally center portions of the core members, and rod members 22 are inserted into respective rod holes 20. These rod members 22 are connected to a pair of annular end plates 24 arranged at both axial ends of the laminated core members 16. Each end plate 24 is fixed to the shaft 12 by shrink fitting or bonding.

Figure 2A:
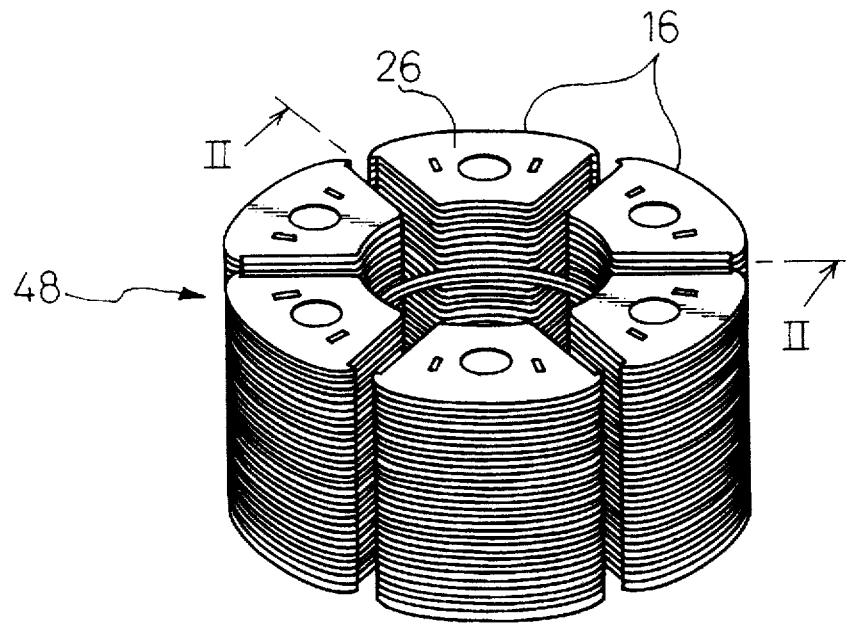
FIG. 2A is a perspective view of an integral laminated rotor core of the rotor shown in FIG. 1A.
Figure 2B:
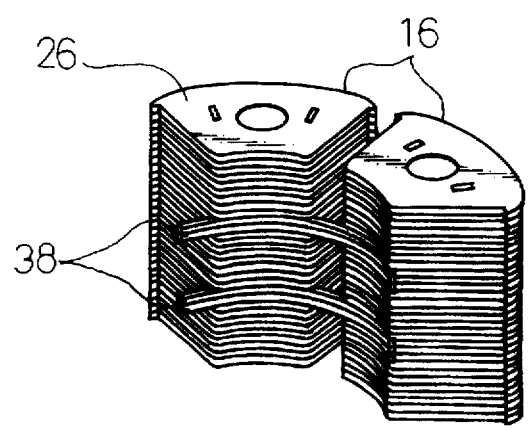
FIG. 2B is a perspective view of a part taken along line II—II of FIG. 2A.
Figure 3A:
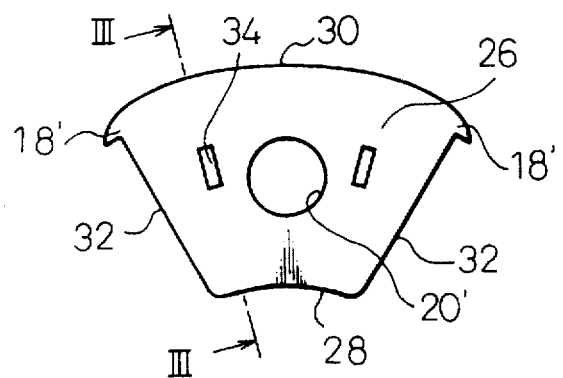
FIG. 3A is a plan view of a core-lamination of the integral laminated rotor core shown in FIG. 2A.
Figure 3B:
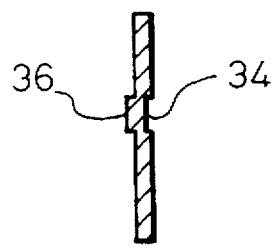
FIG. 3B is a sectional view taken along line III—III of FIG. 3A.

As shown in FIGS. 2A and 2B, the laminated core members 16 forming six magnetic poles of the rotor 10 are formed by stacking a plurality of core-laminations 26 made of magnetic materials such as silicon steel plates and joining them to each other. As more clearly shown in FIGS. 3A and 3B, the core-lamination 26 has a generally sector shape in a plan view, which includes an arcuate inner edge 28 adapted to surround the shaft 12, an outer edge 30 with a predetermined curved-out shape adapted to be opposed to a stator (not shown), and both sides 32 adapted to be brought into contact with the permanent magnet 14. The core-lamination 26 is provided at both sides 32 thereof with outer hook elements 18' extended from the outer edge 30, and at the center thereof with a rod hole element 20'. When the core-laminations 26 are stacked in an exactly superimposed manner, the outer hook elements 18' and the rod hole elements 20' are axially joined and form the outer hook 18 and the rod hole 20. The core-lamination 26 is provided on respective axial end faces thereof with a recess 34 and a projection 36 formed at a corresponding position, the projection being able to be fitted into the recess. The core-laminations 26 are stacked in such a manner that the recess 34 and the projection 36 of the adjacent core-laminations 26 are aligned with each other, and after that the core-laminations 26 are joined together by a press-fitting process using, e.g., a press machine (not shown).

Figure 4:
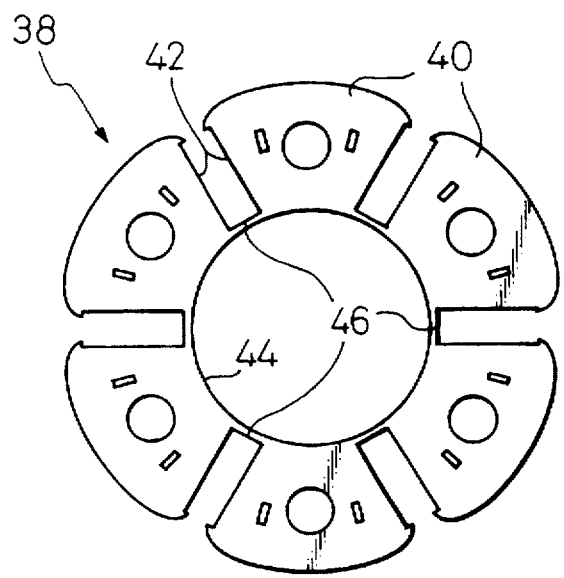
FIG. 4 is a plan view of an integral core-lamination of the integral laminated rotor core shown in FIG. 2A.

As shown in FIGS. 2A and 2B, a plurality of integral core-laminations 38 are inserted or arranged at predetermined positions in a laminated construction formed by the core-laminations 26 of each laminated core member 16. As shown in FIG. 4, the integral core-lamination 38 includes six core-lamination sections 40 each having the same shape as the core-lamination 26. Each core-lamination section 40 is stacked and joined together with the large number of core-laminations 26 in the above-mentioned manner to form the laminated core member 16. The core-lamination section 40 includes connecting portions 46 extended in the circumferential direction from both sides 42 at an inner edge 44 of the core-lamination section. The core-lamination sections 40 are mutually connected through the connecting portions 46 in such a relative arrangement that a space for locating the permanent magnet 14 is defined between the adjacent core-lamination sections 40. In this manner, the integral core-lamination 38, of which all core-lamination sections 40 are annularly connected, is formed.

In the illustrated embodiment, four integral core-laminations 38 are arranged at two positions dividing the laminated length of the core-laminations 26 of each laminated core member 16 into three generally equal parts; two integral core-laminations being arranged at each of the two positions. When the large number of core-laminations 26 and the four integral core-laminations 38, which are arranged in this manner, are joined together by a press-fitting process, the laminated core members 16 are mutually connected in such a relative arrangement of a finished assembly that a space for locating the permanent magnet 14 is defined between the adjacent laminated core members 16 as shown in FIG. 1B, whereby an integral laminated rotor core 48 is formed (see FIG. 2A). It should be noted that a different number of the integral core-laminations 38 may be provided other than the above-mentioned number, but preferably a small number are provided as long as the mechanical strength of the connecting structure between the laminated core members can be maintained, from the viewpoint of the reduction of magnetic leakage. Also, the integral core-laminations 38 may have various arrangements in the laminated structure other than the above-mentioned arrangement, but preferably have a regular and symmetrical arrangement in order to obtain an entirely balanced strength.

The connecting poritons 46 of the integral core-lamination 38 are formed relatively thin as long as the mechanical strength can be maintained, in order to prevent magnetic leakage as much as possible. As shown in FIG. 1B, in the integral laminated rotor core 48, the connecting portions 46 of the integral core-lamination 38 are abutted onto the inner surfaces of the permanent magnets 14, which are opposed to the shaft 12, and cooperate with the outer hooks 18 of the laminated core members 16 so as to position and fixedly support the permanent magnets 14. Consequently, the laminated core members 16 do not require inner hooks as used in a conventional structure, and the magnetic leakage caused by the inner hooks can be eliminated. Thus, it has been observed that the magnetic leakage in the integral laminated rotor core 48 is, as a whole, about the same as that in the conventional structure.

The integral laminated rotor core 48 having the above-mentioned structure makes it possible to integrally handle the laminated core members 16 with the same number (six in this embodiment) as the number of magnetic poles in a state in which they are previously positioned relative to each other. Accordingly, in the assembling process of the rotor 10, the permanent magnets 14 can be held between the laminated core members 16 merely by inserting and fitting the permanent magnets 14 into the spaces for locating permanent magnets defined in the integral laminated rotor core 48, whereby the productivity is remarkably improved in the subsequent step of fitting to the shaft 12.

Embodiment 2

Figure 5A:
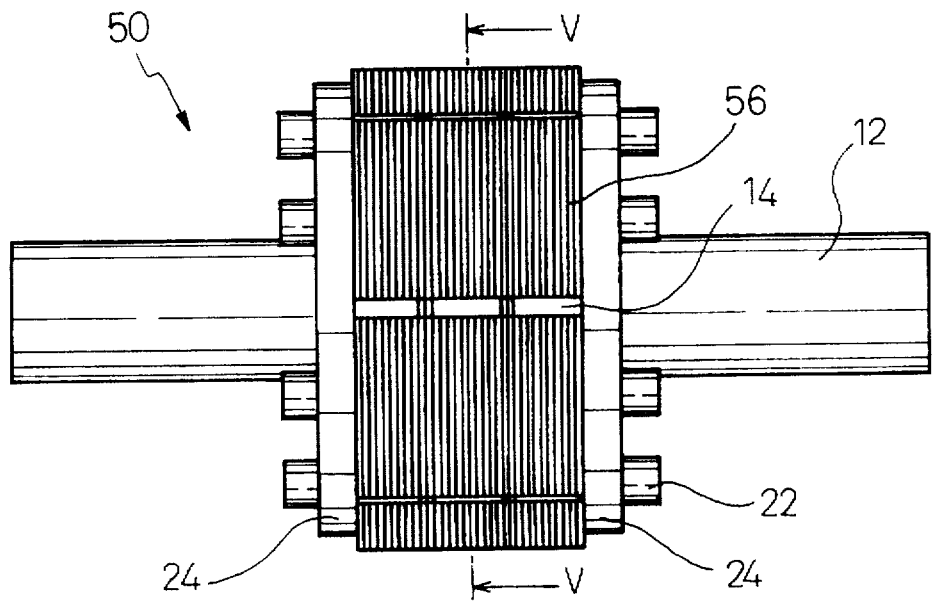
FIG. 5A is a side view of a rotor according to an embodiment 2 of the present invention.
Figure 5B:
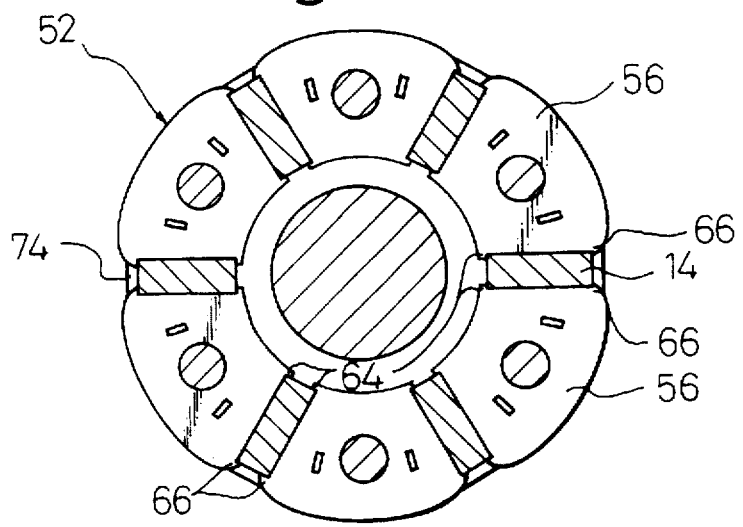
FIG. 5B is a sectional view taken along line V—V of FIG. 5A.
Figure 6:
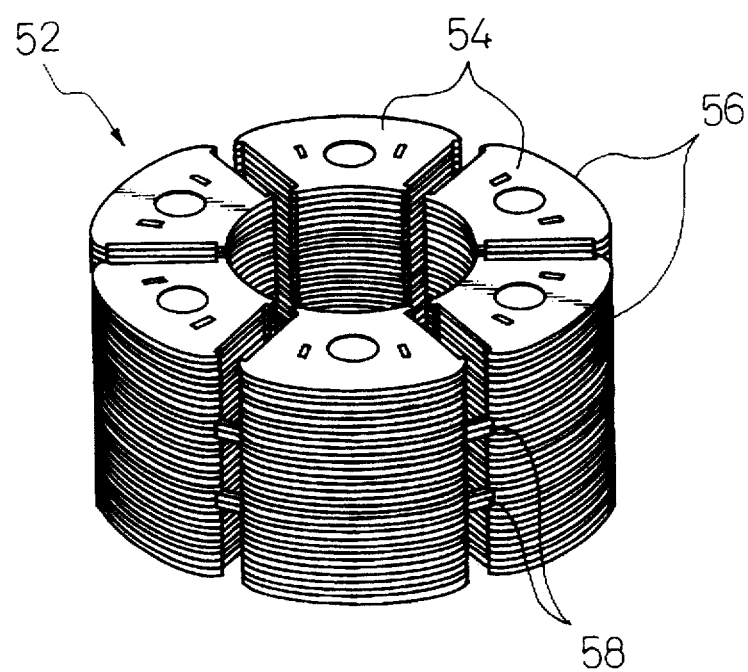
FIG. 6 is a perspective view of an integral laminated rotor core of the rotor shown in FIG. 5A.
Figure 7:
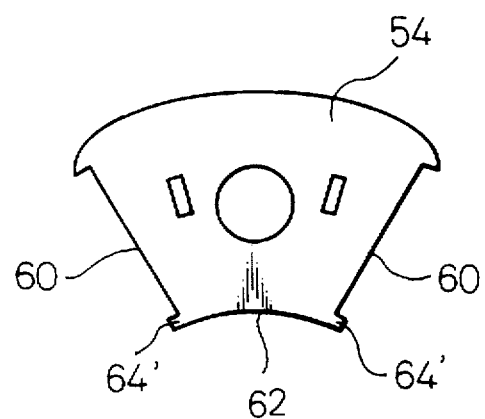
FIG. 7 is a plan view of a core-lamination of the integral laminated rotor core shown in FIG. 6.

FIGS. 5A and 5B show a rotor 50 according to an embodiment 2 of the present invention. The rotor 50 includes an integral laminated rotor core 52 which has a structure similar to the integral laminated rotor core 48 of the embodiment 1. As shown in FIG. 6, the integral laminated rotor core 52 includes a plurality of laminated core members 56 which are formed by stacking and joining the large number of core-laminations 54. These laminated core members 56 are connected together by integral core-laminations 58 which are inserted into the predetermined positions in the laminated structure of the core-laminations 54 and joined together with the latter. As shown in FIG. 7, the core-lamination 54 has substantially the same shape as the core-lamination 26 of the embodiment 1, except that inner hooks 64' are extended in a circumferential direction from both sides 60 at an inner edge 62. The inner hooks 64' form inner hooks 64 of the laminated core member 56 by stacking a plurality of core-laminations 54. The inner hooks 64 cooperate with outer hooks 66 so as to position and fixedly support the permanent magnet 14.

Figure 8:
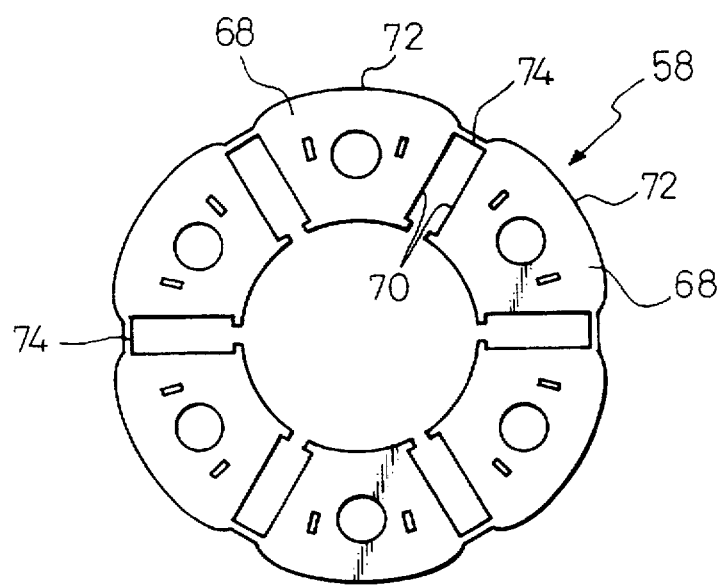
FIG. 8 is a plan view of an integral core-lamination of the integral laminated rotor core shown in FIG. 6.

As shown in FIG. 6, two integral core-laminations 58 are arranged at two positions dividing the laminated length of each laminated core member 56 into three generally equal parts, in the same manner as the embodiment 1. Of course, other numbers or arrangements of the integral core-laminations 58 may be adopted. As shown in FIG. 8, the integral core-lamination 58 includes a plurality of core-lamination sections 68 each having the same shape as the core-lamination 54. Each core-lamination section 68 is stacked and joined together with the large number of core-laminations 54 so as to form the laminated core member 56. The core-lamination section 68 includes connecting portions 74 extended in the circumferential direction from both sides 70 at an outer edge 72 of the core-lamination section. The core-lamination sections 68 are mutually connected through the connecting portions 74 in such a relative arrangement that a space for locating the permanent magnet 14 is defined between the adjacent core-lamination sections 68.

In the rotor 50 including the integral core-laminations 58, the connecting portions 74 for forming the integral laminated rotor core 52 are provided on the outer peripheral edge region adapted to be opposed to a stator, therefore the magnetic leakage performance and the influence for magnetic flux distribution in an air-gap between the stator and rotor are inferior to some extent to the embodiment 1. However, the connecting portions 74 reinforce the support of the permanent magnets against an external force such as a centrifugal force, and thereby improve the mechanical strength of the rotor structure.

Embodiment 3

Figure 9:
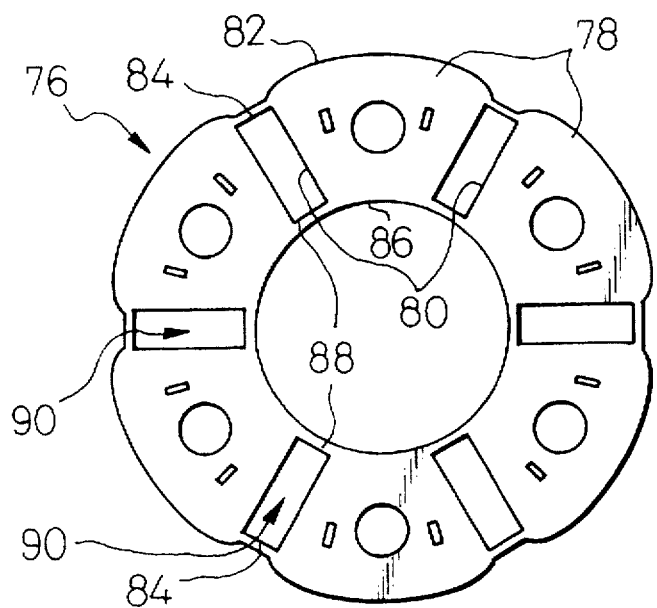
FIG. 9 is a plan view of an integral core-lamination of a rotor according to an embodiment 3 of the present invention.

The rotor according to the present invention may use an integral core-lamination 76 as shown in FIG. 9, in order to form an integral laminated rotor core. The integral core-lamination 76 includes a plurality of core-lamination sections 78 which have substantially the same shape as the core-lamination 26 of the embodiment 1.

Each core-lamination section 78 includes outer peripheral connecting portions 84 extended in the circumferential direction from both sides 80 at an outer edge 82 and inner peripheral connecting portions 88 extended in the circumferential direction from both sides 80 at an inner edge 86. The core-lamination sections 78 are mutually connected through the outer and inner peripheral connecting portions 84 and 88 in such a relative arrangement that a space 90 for locating a permanent magnet is defined between the adjacent core-lamination sections 78.

Figure 10:
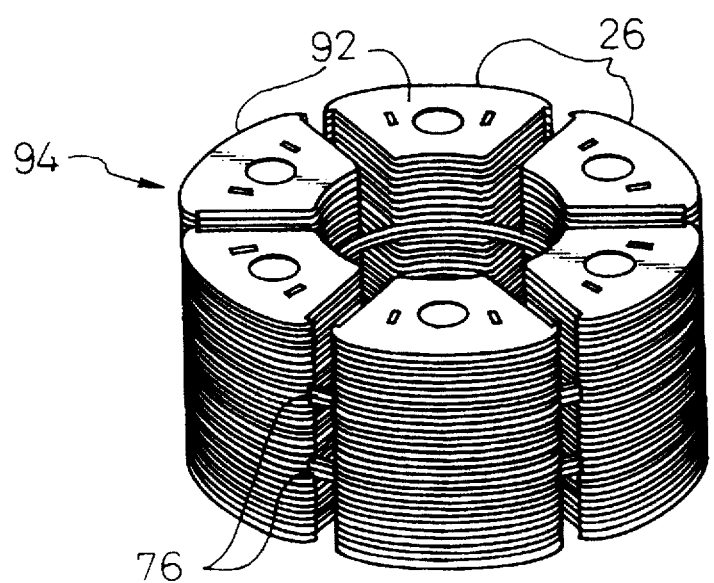
FIG. 10 is a perspective view of an integral laminated rotor core using the integral core-lamination shown in FIG. 9.

Each core-lamination section 78 of the integral core-lamination 76 is stacked and joined with the core-laminations 26 of the embodiment 1. An integral laminated rotor core 94 as shown in FIG. 10 is formed in this manner, which includes a plurality of laminated core members 92 connected to each other. In the case of using the integral core-lamination 76, the magnetic leakage performance and the influence on magnetic flux distribution in an air-gap are inferior to some extent to the embodiment 1, because the structure has the outer peripheral connecting portions 84. However, the mechanical strength of the integral laminated rotor core 94 is more stable than that of both the above embodiments. Also, the productivity for assembling the rotor is better than both of the above embodiments.

Embodiment 4

Figure 11A:
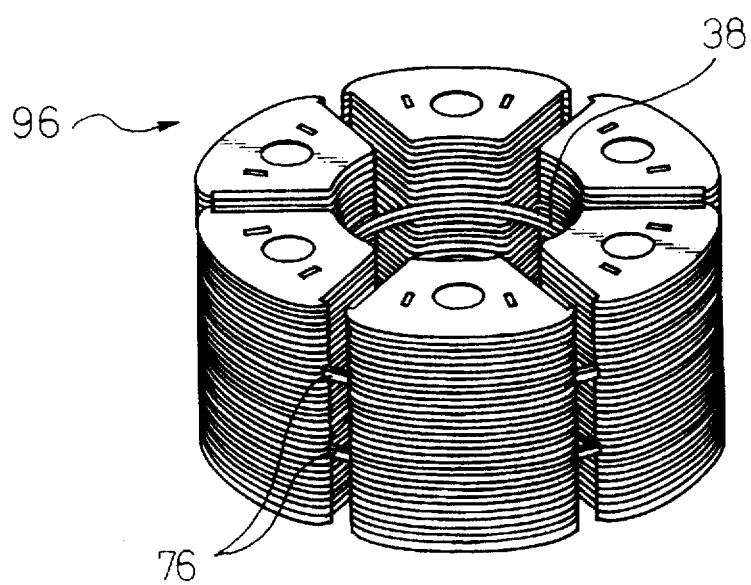
FIG. 11A is a perspective view of an integral laminated rotor core of a rotor according to an embodiment 4 of the present invention.
Figure 11B:
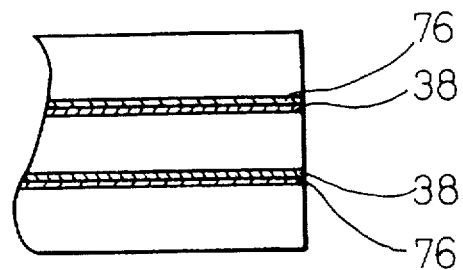
FIG. 11B is a schematic view of a laminated construction of the integral laminated rotor core shown in FIG. 11A.

An integral laminated rotor core 96 as shown in FIG. 11A is formed by replacing two of four integral core-laminations 38 of the inner periphery connecting type (FIG. 4), in the integral laminated rotor core 48 of the embodiment 1, with the integral core-laminations 76 of the inner and outer peripheries connecting type (FIG. 9). From the viewpoint of rotor balance, it is preferred that one integral core-lamination 38 is directly superimposed on one integral core-lamination 76 as shown in FIG. 11B and they are arranged at two positions that divide the laminated length of rotor into three generally equal parts. The integral laminated rotor core 96 has a mechanical strength greater than that of the integral laminated rotor core 48 of the embodiment 1 and a magnetic performance superior to that of the integral laminated rotor core 94 of the embodiment 3.

Embodiment 5

Figure 12A:
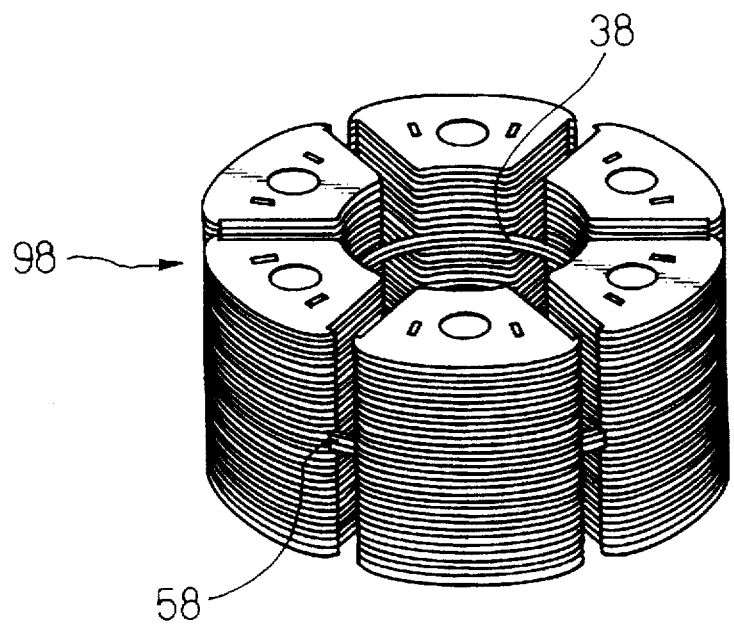
FIG. 12A is a perspective view of an integral laminated rotor core of a rotor according to an embodiment 5 of the present invention.
Figure 12B:
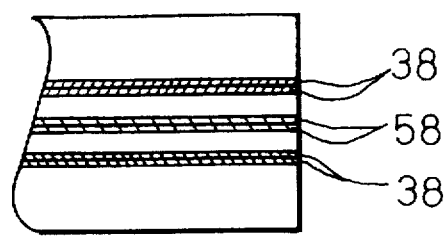
FIG. 12B is a schematic view of a laminated construction of the integral laminated rotor core shown in FIG. 12A.

An integral laminated rotor core 98 as shown in FIG. 12A is formed by adding two integral core-laminations 58 of the outer periphery connecting type (FIG. 8) to the integral laminated rotor core 48 of the embodiment 1, which includes four integral core-laminations 38 of the inner periphery connecting type (FIG. 4). In the illustrated embodiment, from the viewpoint of rotor balance, two mutually superimposed integral core-laminations 58 are arranged at a generally center position between the positions of the two integral core-laminations 38 as shown in FIG. 2B (see FIG. 12B). The integral laminated rotor core 98 has a mechanical strength and a magnetic performance generally equal to those of the integral laminated rotor core 96 of the embodiment 4.

Embodiment 6

Figure 13:
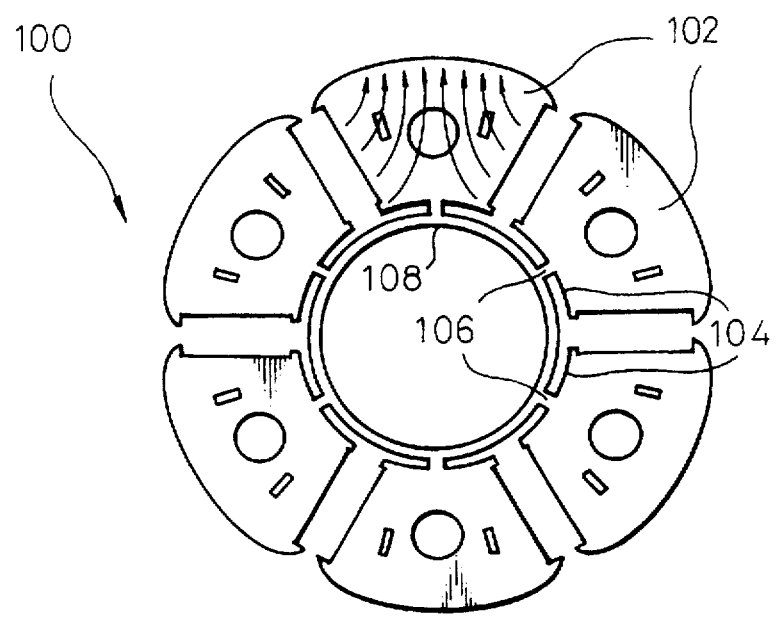
FIG. 13 is a plan view of an integral core-lamination of a rotor according to an embodiment 6 of the present invention.

FIG. 13 shows an integral core-lamination 100 with a different shape, used to form an integral laminated rotor core according to the present invention. The integral core-lamination 100 includes a plurality of core-lamination sections 102, each of which has the same shape as the core-lamination 54 of the embodiment 2 (FIG. 7). Each core-lamination section 102 is inserted into the predetermined position in the laminated structure of the large number of core-laminations 54 and joined together with the latter. Each core-lamination section 102 includes a first connecting portion 106 extended in a radially inward direction from generally the center of an inner edge 104 of the core-lamination section, and is supported by an annular connecting portion 108 adapted to surround the shaft 12 through the first connecting portion 106. In this manner, the core-lamination sections 102 are mutually connected in such a relative arrangement that a space for locating a permanent magnet 14 is defined between the adjacent core-lamination sections 102.

In the case of using the integral core-laminations 100 of the embodiment 6 in place of the integral core-laminations 58 in the integral laminated rotor core 52 of the embodiment 2, the magnetic leakage through the first connecting portions 106 and the annular connecting portion 108 is extremely reduced, because the first connecting portions 106 are disposed at the region having low magnetic flux density from the viewpoint of magnetic flux flow (shown as arrows in FIG. 13) when the permanent magnets 14 are assembled in the integral laminated rotor core 52. The effect of this embodiment on preventing magnetic leakage is extremely superior in comparison with the effect of the embodiment 1. It is noted that a plurality of first connecting portions 106 may be extended in parallel from the general center region of the inner edge 104 of the core-lamination section 102 to such an extent that the magnetic leakage is not increased. In this case, the stiffness of the laminated core member 56 (FIG. 6) against revolution about the first connecting portion 106 is increased.

Embodiment 7

In the above-mentioned embodiments, there is a problem as to how the magnetic leakage can be inhibited, which is caused by the connecting portions of the integral core-lamination used for forming the integral laminated rotor core. In this respect, by integrating only the laminated core members of the same pole instead of integrating all laminated core members of the rotor, the magnetic leakage can be substantially eliminated.

Figure 14:
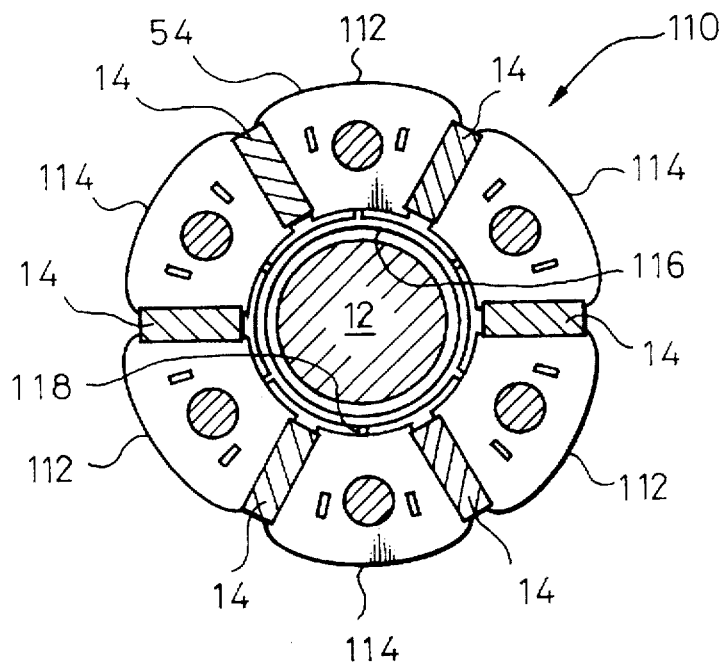
FIG. 14 is a sectional view of a rotor according to an embodiment 7 of the present invention.

A rotor 110 as shown in FIG. 14 includes a plurality of laminated core members 112, 114, both being formed by stacking the large number of core-laminations 54, in the same manner as the embodiment 2. The laminated core members 112 and 114 are alternately magnetized by the permanent magnets 14. In the illustrated embodiment, three laminated core members 112 establishing N-poles are mutually connected through first integral core-laminations 116 which are inserted and joined to the predetermined positions in a laminated structure, and three laminated core members 114 establishing S-poles are mutually connected through second integral core-laminations 118 which are inserted and joined to the predetermined positions in a laminated structure.

Figure 15A:
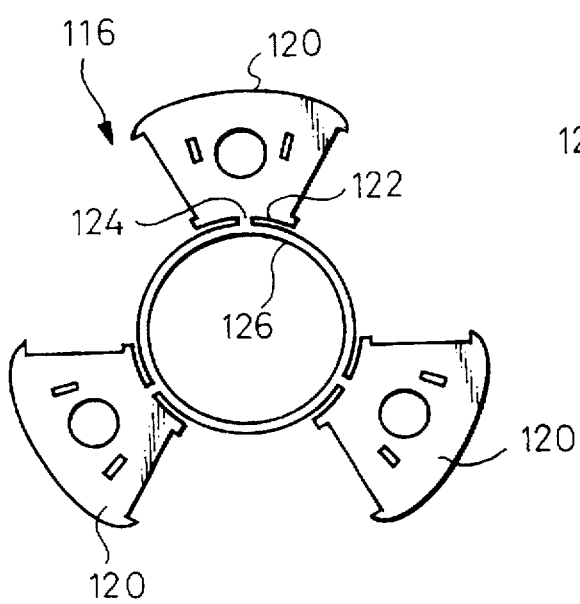
FIGS. 15A and 15B are plan views of integral core-lamination of a rotor shown in FIG. 14.
Figure 15B:
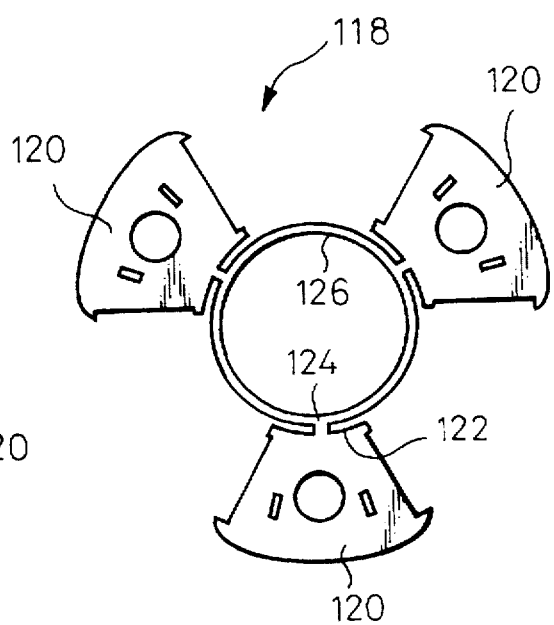

As shown in FIGS. 15A and 15B, the first integral core-lamination 116 has the same structure as the second integral core-lamination 118, and both include three core-lamination sections 120 each having the same shape as the core-lamination 54. Each core-lamination section 120 includes a first connecting portion 124 extended in a radially inward direction from a generally center of an inner edge 122 of the core-lamination section, and is supported by an annular connecting portion 126 adapted to surround the shaft 12 (FIG. 14) through the first connecting portion 124. In this manner, the core-lamination sections 120 are mutually connected in such a relative arrangement that a space for locating two permanent magnets 14 (FIG. 14) and one another pole's core-lamination section 120 is defined between the adjacent core-lamination sections 120.

Figure 16A:
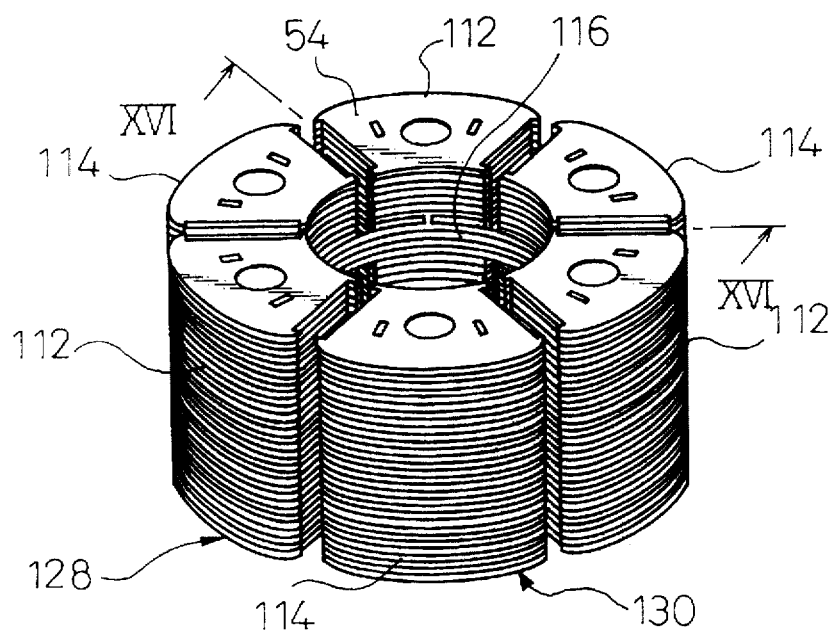
FIG. 16A is a perspective view of two integral laminated rotor cores of the rotor shown in FIG. 14.
Figure 16B:
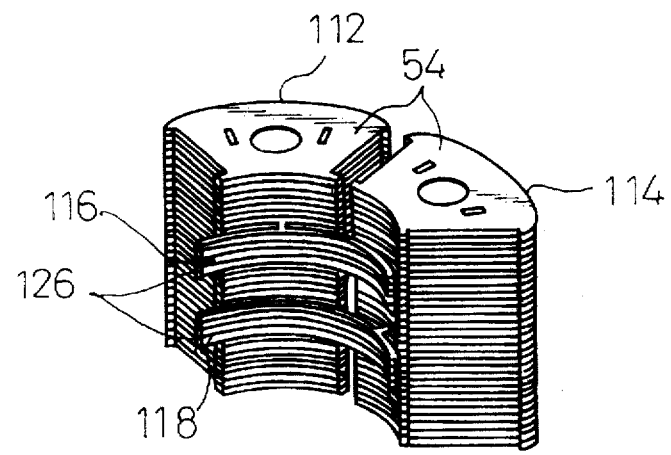
FIG. 16B is a perspective view of a part taken along line XVI—XVI of FIG. 16A.

As shown in FIGS. 16A and 16B, four first integral core-laminations 116 are mutually superimposed and arranged at a position spaced a distance of generally one-third of a laminated length from one axial end face of the laminated core member 112 establishing a N-pole, and the core-lamination sections 120 thereof are joined together with the large number of core-laminations 54 by a press-fitting process. Also, four second integral core-laminations 118 are mutually superimposed and arranged at a position spaced a distance of generally one-third of a laminated length from one axial end face of the laminated core member 114 establishing a S-pole, and the core-lamination sections 120 thereof are joined together with the large number of core-laminations 54 by a press-fitting process. In this manner, an integral laminated rotor core 128 for N-poles and an integral laminated rotor core 130 for S-poles are formed. Then, the integral laminated rotor core 128 for N-poles and the integral laminated rotor core 130 for S-poles are assembled together in such a manner that the respective three laminated core members 112 and 114 are positioned alternately in a circumferential direction, and that the annular connecting portions 126 of the respective integral core-laminations 116 and 118 do not interfere with each other. After that, the permanent magnets 14 are inserted between the respective adjacent laminated core members 112, 114. In this state, the integral laminated rotor cores 128 and 130 are fixedly installed onto the shaft 12 through the rod members 22 and the end plates 24 in the same manner as the embodiments 1 to 6, whereby the rotor 110 shown in FIG. 14 is formed.

In the rotor 110, the laminated core members 112, 114 of the same magnetic poles are respectively integrated, therefore, in comparison with the structures of the embodiments 1 to 6, in which all laminated core members are integrated, the assembling productivity is inferior to some extent but the magnetic leakage is substantially eliminated. Of course, it has a superior workability in comparison with the conventional structure in which all laminated core members are separated. The integral core-laminations 116, 118 may have various arrangements and different numbers of the laminated core members 112, 114, other than those mentioned above. However, it is necessary to eliminate a mutual contact between the annular connecting portions 126 of the integral core-laminations 116, 118 when the integral laminated rotor core 128 for N-poles is assembled with the integral laminated rotor core 130 for S-poles. Further, a well balanced arrangement as a whole is required.

Figure 17:
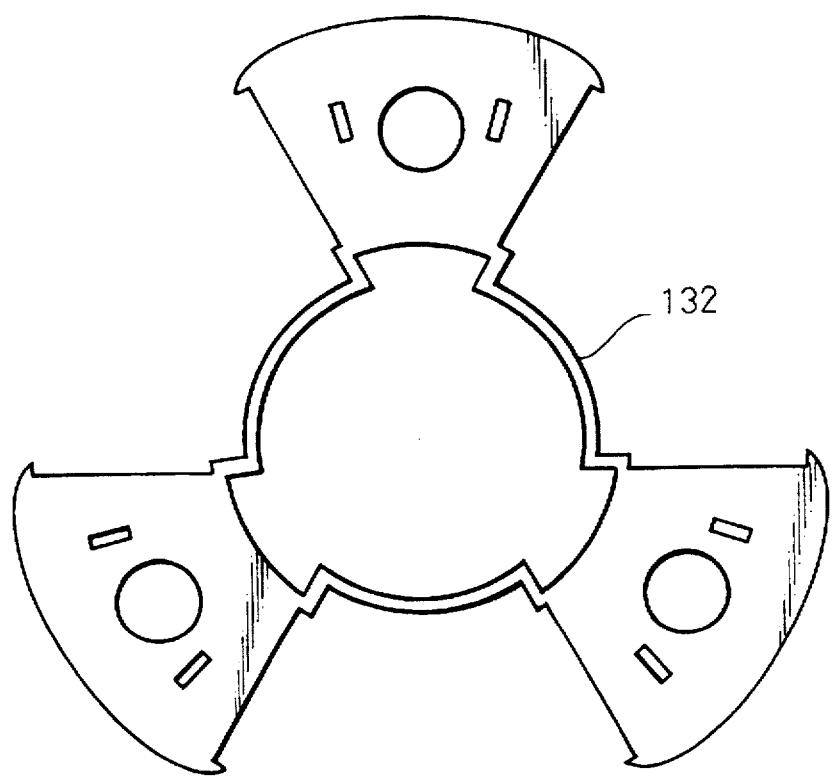
FIG. 17 is a plan view of a modification of a core-lamination of the integral laminated rotor core shown in FIG. 16.

The connecting construction between the core-lamination sections 120 of the integral core lamination 116, 118 is not restricted as the first and annular connecting portions 124 and 126 as mentioned above, but may be use connecting portions 132 each having a shape easily made by a stamping process, as shown in FIG. 17. In the case of using this shape, the connecting portions 132 must be formed so as to eliminate any contact with the adjacent core-laminations 54 of another pole.

Embodiment 8

Figure 18:
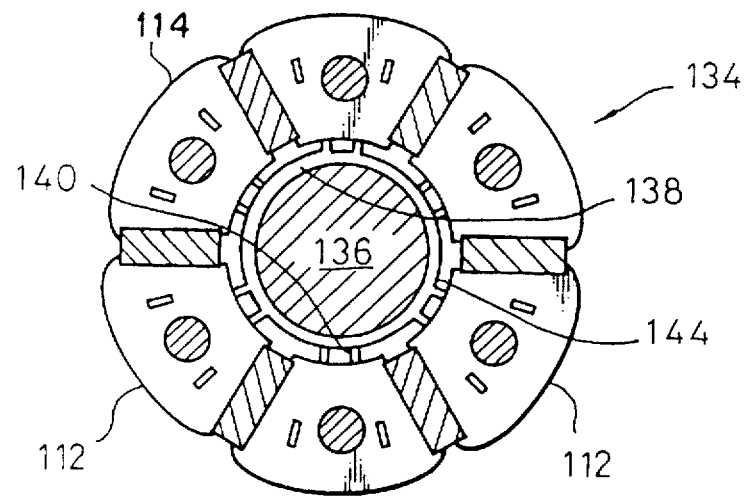
FIG. 18 is a sectional view of a rotor according to an embodiment 8 of the preset invention.
Figure 19A:
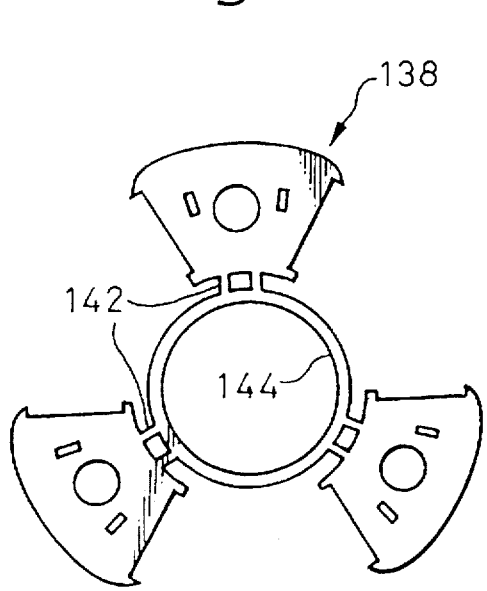
FIGS. 19A and 19B are plan views of integral core-laminations of a rotor shown in FIG. 18.
Figure 19B:
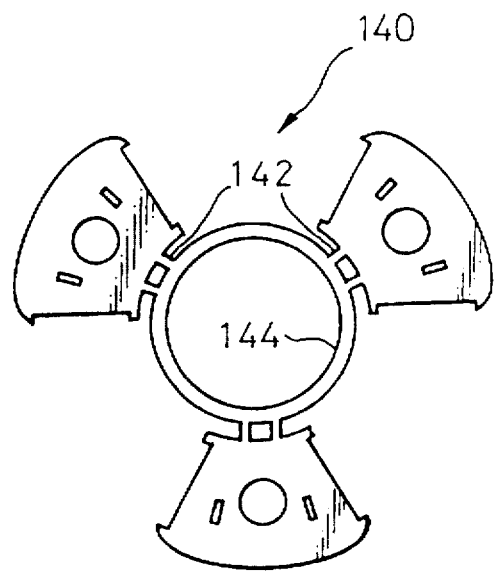

A rotor 134 shown in FIG. 18 includes a shaft 136 made of a non-magnetic material such as a stainless steel. Further, a first integral core-lamination 138 shown in FIG. 19A is used to connect the laminated core members 112 for N-poles with each other, and a second integral core-lamination 140 shown in FIG. 19B is used to connect the laminated core members 114 for S-poles with each other. Each of the integral core-laminations 138, 140 has a structure similar to that of each integral core-lamination 116, 118 in the embodiment 7, but, regarding the connecting construction between the core-lamination sections, includes a plurality of first connecting portions 142 and an annular connecting portion 144 both having higher strength. The inner diameter of the annular connecting portion 144 is generally equal to the outer diameter of the shaft 136. Therefore, the annular connecting portion 144 is closely fit to the shaft 136, whereby the mechanical strength of the rotor 134, particularly the strength against radial load applied to the shaft 136, can be further improved.

Embodiment 9

Figure 20:
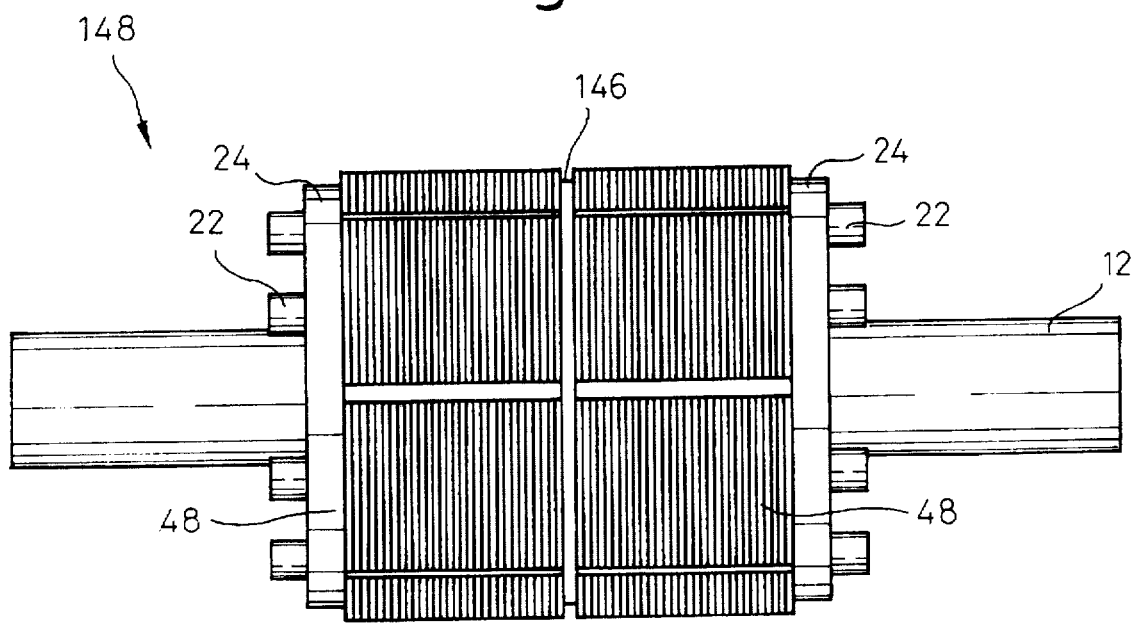
FIG. 20 is a sectional view of a rotor according to an embodiment 9 of the present invention.

In the rotor of the embodiments 1 to 8, it is possible to form a high-power multi-section rotor by disposing axially side by side a plurality of integral laminated rotor cores with the same structure. For example, as shown in FIG. 20, two integral laminated rotor cores 48 in the embodiment 1 are disposed axially side by side through a circular plate member 146, and are fixedly installed to the shaft 12 through the rod members 22 and the end plates 24, whereby a high-power rotor 148 can be formed. In this case, the permanent magnets 14 of the embodiment 1 may be used as they are, or longer permanent magnets having overall lengths corresponding to the total length of two integral laminated rotor cores 48 may be used.

Manufacturing Process

Figure 21:
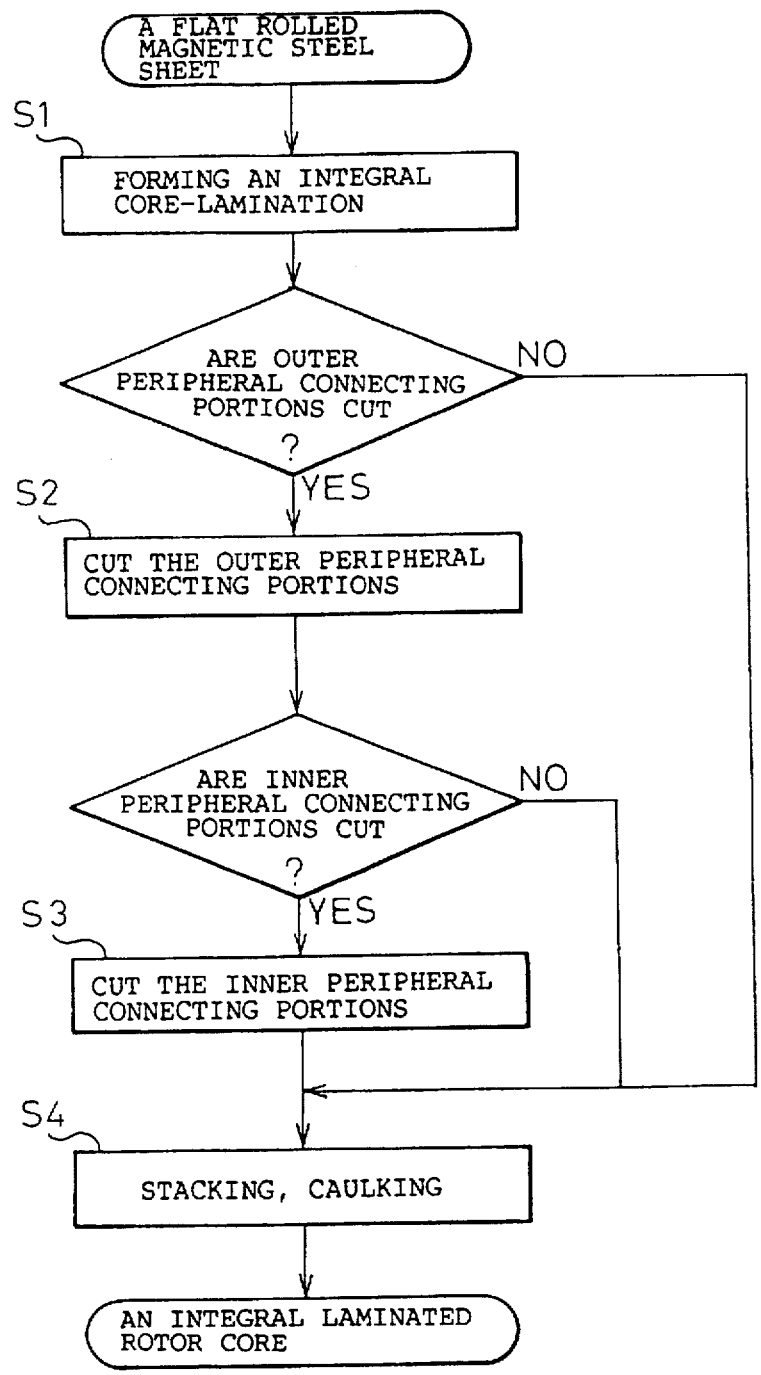
FIG. 21 is a flow chart showing a manufacturing process of the integral laminated rotor core shown in FIG. 11A.
Figure 22:
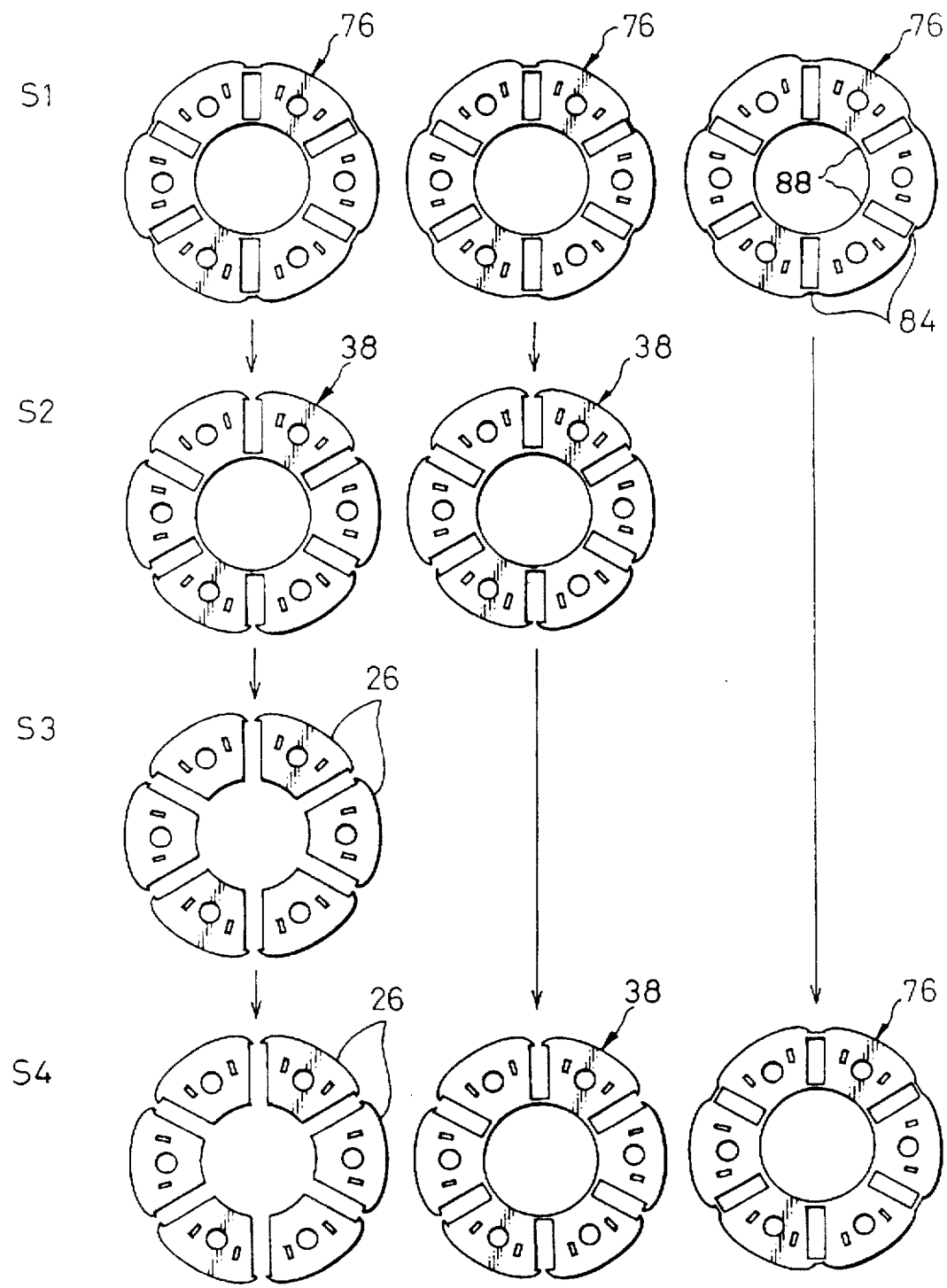
FIG. 22 is an illustration of stamped products formed at respective steps according to the manufacturing process shown in FIG. 21.

The integral laminated rotor cores of the rotors according to the embodiments 1 to 9 can be conveniently manufactured by one progressive die machine which can carry out various processes while choosing desired press-stations, from the viewpoint of maintaining productivity. A manufacturing process for an integral laminated rotor core 96 according to the embodiment 4 is schematically described, by way of example, with reference to FIGS. 21 and 22. In this case, an integral core-lamination 76 of inner and outer peripheries connecting type (FIG. 9) is formed as a basic shape by stamping a flat rolled magnetic steel sheet, at a first station S1. The integral core-lamination 76 is conveyed successively to following stations by a conveying device of the progressive die machine. At a next station S2, whether to cut outer peripheral connecting portions 84 or not is decided. If the integral core-lamination was not cut at the outer portions 84, it is conveyed to the last station S4 so as to be used as the integral core-lamination 76. Further at a next station S3, whether to cut inner peripheral connecting portions 88 or not is decided. If the integral core-lamination was not cut at the outer portions 88, it is conveyed to the last station S4 so as to be used as an integral core-lamination 38 of inner periphery connecting type (FIG. 4), and if the integral core-lamination was cut at the inner portions, it is conveyed to the last station S4 so as to be used as six core-laminations 26 while keeping the relative arrangement. At the last station S4, the integral core-laminations 76, the integral core-laminations 38 and the core-laminations 26 are collected into the above-mentioned stacking arrangement, and are joined with each other by press-fitting, so as to form the integral laminated rotor core 96.

Figure 23:
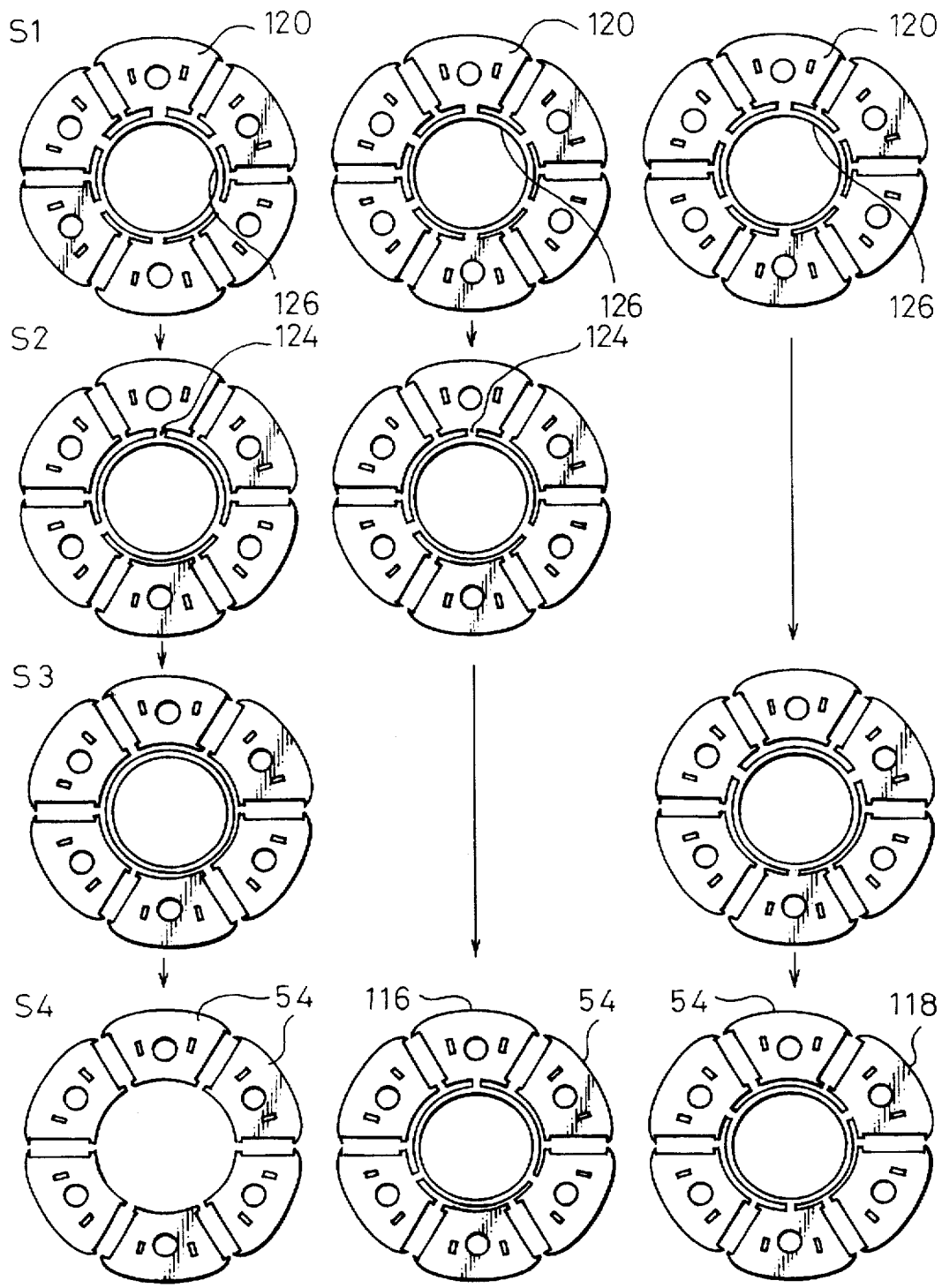
FIG. 23 is an illustration showing a manufacturing process of the integral laminated rotor core shown in FIG. 14 by stamped products formed at respective steps thereof.

FIG. 23 shows a manufacturing process for an integral laminated rotor core 128 for N-poles and an integral laminated rotor core 130 for S-poles according to the embodiment 7, which uses the above progressive die machine. First, an integral core-lamination (identical to the integral core-lamination 100 in the embodiment 6), of which all core-lamination sections 120 are connected by an annular connecting portion 126, is formed as a basic shape by stamping a flat rolled magnetic steel sheet, at a first station S1. At a next station S2, whether to cut every other one of first connecting portions 124 of the core-lamination sections 120 or not is decided. If the integral core-lamination was not cut, it is conveyed to a next station S3. Further at the next station S3, whether to cut first connecting portions 124 of the remaining three core-lamination sections 120 or is decided. If the integral core-lamination was not cut at the stations S2 and S3, it is conveyed to the last station S4, after removing the annular connecting portion 126, so as to be used as six separated core-laminations 54 while keeping the relative arrangement. If the integral core-lamination was cut at the station S2 and was not cut at the station S3, it is conveyed to the last station S4 so as to be used as a first integral core-lamination 116 and three separated core-laminations 54 while keeping the relative arrangement. If the integral core-lamination was not cut at the station S2 and was cut at the station S3. it is conveyed to the last station S4 so as to be used as a second integral core-lamination 118 and three separated core-laminations 54 while keeping the relative arrangement. At the last station S4, the first integral core-laminations 116, the second integral core-laminations 118 and the core-laminations 54 are collected into the above-mentioned stacking arrangement, and are joined with each other by press-fitting, so as to respectively form the integral laminated rotor core 128 for N-poles and the integral laminated rotor core 130 for S-poles in a relative arrangement of a finished assembly.

As is clear from the above description, the present invention provides an integral laminated rotor core in which laminated core members forming magnetic poles are connected with each other, by inserting at least one integral core-lamination into the laminated structure of the laminated core members. Therefore, the work of positioning or fixing permanent magnets and laminated core members in an assembling process of a rotor is facilitated, and productivity is significantly improved. Further, the mechanical strength of a rotor is improved by the integral laminated rotor core. Consequently, the performance and reliability of high speed or high torque motors can be improved by using the rotor according to the present invention.

The present invention has been described in relation to the various embodiments shown in the attached drawings, but is not restricted by the above descriptions, and various changes and modifications can be carried out without departing from the spirit and scope of the invention recited in the appended claims.

We claim:

1. A rotor for a synchronous motor comprising: a shaft;
   a plurality of permanent magnets disposed around said shaft at generally equal intervals;
   a plurality of laminated core members each formed by axially stacking and joining a plurality of core-laminations made of magnetic materials, said laminated core members being disposed around said shaft while holding each of said permanent magnets therebetween in a circumferential direction, so as to form magnetic poles;
   supporting means for fixedly supporting said permanent magnets and said laminated core members onto said shaft, said supporting means including a pair of end plates disposed at both axial ends of said laminated core members and fixed to said shaft and a plurality of rod members penetrating through said laminated core members and joined at both ends to said end plates; and
   at least one integral core-lamination made of a magnetic material being the same as that of each of said core-laminations, and including a desired number of core-lamination sections locally inserted and fixed between said core-laminations forming each of said laminated core members located at desired positions around said shaft, and located at a position between said end plates axially dividing the laminated length of the core-laminations into generally equal parts allowing magnetic and mechanical balance to be maintained, and also including connecting portions extended from said desired number of core-lamination sections so as to annularly connect all of said core-lamination sections, wherein said connecting portions of said at least one integral core-lamination are extended in a circumferential direction from both sides of respective ones of said core-lamination sections on inner edges opposed to said shaft whereby said laminated core members located at desired positions are fixedly connected with each other in a relative arrangement of a finished rotor assembly;
   and wherein said at least one integral core-lamination is formed with a central opening of diameter greater than that of said shaft, such that a gap is defined between said at least one integral core-lamination and said shaft so said at least one core-lamination and said core members are supported against external force only by said end plates and said rod members.

2. A rotor as set forth in claim 1, wherein said at least one integral core-lamination connects all of said laminated core members.

3. A rotor as set forth in claim 1, wherein said at least one integral core-lamination includes said core-lamination sections having shapes being generally the same as those of said core-laminations of said laminated core members and a number thereof being the same as a number of magnetic poles so as to be joined to adjacent ones of said core-laminations, whereby all of said laminated core members are connected in such a relative arrangement of a finished rotor assembly that a space for locating each permanent magnet is defined between adjacent laminated core members, so as to form an integral laminated rotor core.

4. A rotor as set forth in claim 1, wherein said at least one integral core-lamination and said core-laminations are respectively formed by stamping same materials into predetermined shapes by one progressive die machine which can carry out various processes while choosing desired press-stations, and said laminated core members are formed by press-fitting and joining said integral core-lamination and said core-laminations, both of which have been stamped, with each other in a last press-station of said progressive die machine, whereby said laminated core members located at desired positions are connected with each other in said relative arrangement of said finished rotor assembly.

5. A rotor as set forth in claim 1 wherein said at least one integral core-lamination comprises a plurality of groups of integral core-laminations, said groups being substantially equally spaced between said end plates so as to divide said laminated length of the core laminations into several substantially equal parts.

6. A rotor as set forth in claim 5 wherein each group of integral core-laminations consists of at least two laminations, and two such groups divide said laminated length of the core laminations into three parts.

* * * * *